United States Patent Office 3,468,838
Patented Sept. 23, 1969

3,468,838
SILICONE RUBBER MATERIALS
Nevison G. Loraine and John B. Lidgate, Newcastle-upon-Tyne, England, assignors to George Angus & Company Limited, Newcastle-upon-Tyne, England, a British company
No Drawing. Filed Sept. 7, 1966, Ser. No. 577,589
Claims priority, application Great Britain, Sept. 17, 1965, 39,752/65
Int. Cl. C09g 47/06, 51/04
U.S. Cl. 260—37                                    10 Claims

ABSTRACT OF THE DISCLOSURE

Rubber-like compositions suitable for oil seals or the like, which are likely to have prolonged contact with oils at high temperatures and containing as additives complex chemical compounds containing one or more of the elements sulphur, chlorine and phosphorus, are formed from a silicone rubber stock with a silica filler and magnesium oxide in a proportion 2–75 parts by weight per 100 parts of the silicone rubber stock. It is found that such additions of magnesium oxide greatly increase the operational life of such oil seals and the like.

---

This invention comprises improvements relating to silicone rubber materials.

It has long been known that articles prepared from vulcanised silicone rubber materials deteriorate when they are exposed at elevated temperatures above 140° C. to mineral oils containing additives which are complex chemical compounds containing one or more of the elements in the group comprising sulphur, chlorine and phosphorus. After a period of time, the silicone rubber article loses its strength and cracks on bending, and sometimes the rubber loses its resilient character and becomes somewhat plastic.

It is an object of this invention to improve the useful life of articles of a silicone rubber material which are likely to be exposed at elevated temperatures to oils having additives as above set forth.

According to the present invention, this object is achieved by incorporating in the silicone rubber material a selected proportion of magnesium oxide.

The proportion of magnesium oxide may be varied between about 2 and 75 parts by weight of the magnesium oxide to 100 parts of base rubber with beneficial results and a substantial improvement in the life of articles is achieved if a proportion of about 10 to 20 parts by weight of magnesium oxide is incorporated in the silicone rubber mix per 100 parts of base rubber.

The following are two examples of suitable formulations:

|  | A | B |
|---|---|---|
| Silicone base stock | 100 | 100 |
| Reinforcing silica filler | 18 | 5 |
| Semi-reinforcing silica | 50 | 50 |
| Magnesium oxide | 10 | 10 |
| Iron oxide | 4 | 4 |
| 2:4 dichlorobenzoyl peroxide (50% paste) | 1.9 | 1.9 |
|  | 183.9 | 170.9 |

Products produced from these silicone rubber formulations have been exposed at about 150° C. to an oil containing an additive of the kind above mentioned for 15 weeks before the first signs of cracking become apparent, whereas a product from the same formulation but omitting the magnesium oxide has a life of 10 weeks.

Similar effects are obtained by addition of magnesium oxide to a variety of basic silicone rubber formulations including fluorosilicone rubbers.

Examples of such basic formulations are as follows:

EXAMPLE 1

| Silicone base stock | 100 |
|---|---|
| Non-reinforcing silica | 200 |
| Benzoyl peroxide (50% paste) | 1.2 |
|  | 301.2 |

EXAMPLE 2

| Silicone base stock | 100 |
|---|---|
| Reinforcing silica | 20 |
| Dicumyl peroxide (40% active) | 2 |
|  | 122 |

EXAMPLE 3

| Fluorosilicone rubber | 100 |
|---|---|
| Diatomaceous earth | 20 |
| Iron oxide | 2 |
| Benzoyl peroxide (50% paste) | 1.2 |
|  | 123.2 |

The results are given below of tests on a series of formulations in which a base stock silicone rubber has added to it not only various proportions of magnesium oxide in accordance with the invention, but also silica fillers which are well known as compounding ingredients and either 2:4 dichloro-benzoyl peroxide or dicumyl peroxide which are vulcanising or cross-linking agents. The results of tests on a formulation without magnesium oxide are also given for comparison purposes.

| Formulation No. | C | D | E | F | G | H | I |
|---|---|---|---|---|---|---|---|
| Silicone base stock | 100 | 100 | 100 | 100 | 100 | 100 | 100 |
| Reinforcing silica filler | 5 | 5 | 5 | 5 | 5 | 5 | 5 |
| Semi-reinforcing silica filler | 45 | 45 | 45 | 40 | 35 | 15 | Nil |
| Magnesium oxide | Nil | 2 | 10 | 20 | 30 | 50 | 75 |
| Iron oxide | 4 | 4 | 4 | 4 | 4 | 4 | 4 |
| 2:4 dichlorobenzoyl peroxide (50% paste) | 1.9 | 1.9 | 1.9 | 1.9 | | | |
| Dicumyl peroxide (40% active) | | | | | 2 | 2 | 2 |

The above formulations may be prepared by any of the well-known methods, but in the present instance are mixed together on a two-roll mill. The silica fillers and magnesium oxide are incorporated into the silicone base stock at the same time followed by the iron oxide and finally the selected cross-linking agent.

After mixing, the compound is vulcanised by any well-known procedure—for instance by compression moulding at a temperature dependent upon the cross-linking agent used. If desired, vulcanisation can be further extended—for instance by heating in an oven.

The vulcanising procedures used in the tests are as follows: Nos. C to F press curing for 5 minutes at 250° F. and Nos. G to I for 10 minutes at 330° F. followed in all cases by heating or baking in an oven for 2 hours at 200° C. followed by 1 hour at 250° C. Tests on the vulcanised silicone-rubber products showed the following physical properties.

| Formulation No. | C | D | E | F | G | H | I |
|---|---|---|---|---|---|---|---|
| Hardness, degrees British standard | 69 | 69 | 72 | 73 | 75 | 80 | 86 |
| Tensile strength, lbs. per sq. inch | 800 | 800 | 770 | 700 | 620 | 580 | 490 |
| Elongation at break, percent | 120 | 120 | 120 | 110 | 100 | 80 | 80 |

The resistance to deterioration at elevated temperatures in lubricating oils containing additives is determined as follows. Test pieces of each formulation 2" x 1" x 1/10" thick are totally immersed in typical additive-containing lubricating oils at 175° C. At intervals of time the test pieces are withdrawn, wiped and carefully examined by bending over a 1″ diameter steel mandrel. The time in hours before cracks begin to appear after the bending test is noted. For the above formulations the results obtained are shown in the following table.

| Formulation No. | C | D | E | F | G | H | I |
|---|---|---|---|---|---|---|---|
| Oil 1 (Shell Spirax EP90) | 24 | 48 | 140 | 140 | 96 | 96 | 36 |
| Oil 2 (Duckhams Q5050 transmission oil) | 36 | 72 | 168 | 168 | 168 | 168 | 168 |
| Oil 3 (Castrol storage oil 40) | 36 | 60 | 96 | 120 | 120 | 120 | 120 |

The advantages of incorporating magnesium oxide are clearly shown. In every case there is considerable improvement in the exposure time before deterioration occurs. The advantage of improved resistance to deterioration occurs over the range of addition of magnesium oxide from 2 parts to 75 parts to 100 parts of silicone base stock.

It will be seen from the above table of physical properties that increasing proportions of magnesium oxide tend to cause an increase in the hardness. The tensile strength and elongation at break percent correspondingly tend to fall. The preferred proportions of magnesium oxide are from about 10 to 20 parts since this shows optimum resistance to deterioration in oils associated with minimum loss in physical properties such as tensile strength and elongation at break. If in any particular application a lower tensile strength for instance can be accepted, there is no reason why higher proportions above the preferred 20 parts of magnesium oxide cannot be used.

The magnesium oxide is conveniently in the form of the commercial product known as "Light Calcined Magnesium Oxide."

The invention also includes articles such as oil seals made from a silicone rubber incorporating a selected proportion of magnesium oxide to increase the resistance of the articles to deterioration in oils at elevated temperatures.

We claim:

1. A rubber material for articles likely to be exposed at elevated temperatures to oils containing as additives complex chemical compounds containing one or more of the elements in the group comprising sulphur, chlorine and phosphorus, said rubber material containing essentially a silicone rubber, a silica filler and magnesium oxide in a proportion 2 to 75 parts by weight per 100 parts by weight of the silicone rubber.

2. A silicone rubber material according to claim 1, wherein the proportion of magnesium oxide is in the range 10 to 20 parts by weight per 100 parts of the silicone rubber.

3. A rubber material as claimed in claim 1 comprising 100 parts of a silicone rubber base stock, 18 parts reinforcing silica filler, 50 parts semi-reinforcing silica, 10 parts magnesium oxide, 4 parts iron oxide and 1.9 parts 2:4 dichlorobenzoyl peroxide, all parts being by weight.

4. A rubber material as claimed in claim 1 comprising 100 parts of a silicone rubber base stock, 5 parts reinforcing silica filler, 50 parts semi-reinforcing silica filler, 10 parts magnesium oxide, 4 parts iron oxide, and 1.9 parts dichlorobenzoyl peroxide, all parts being by weight.

5. A rubber material as claimed in claim 1 comprising 100 parts of a silicon rubber base stock, 5 parts reinforcing silica, 45 parts semi-reinforcing silica, 2 parts magnesium oxide, 4 parts iron oxide and 1.9 parts of a cross-linking agent, all parts being by weight.

6. A rubber material as claimed in claim 1 comprising 100 parts of a silicone rubber base stock, 5 parts reinforcing silica, 45 parts semi-reinforcing silica, 10 parts magnesium oxide, 4 parts iron oxide and 1.9 parts of a cross-linking agent, all parts being by weight.

7. A rubber material as claimed in claim 1 comprising 100 parts of a silicone rubber base stock, 5 parts reinforcing silica, 40 parts semi-reinforcing silica, 20 parts magnesium oxide, 4 parts iron oxide and 1.9 parts of a cross-linking agent, all parts being by weight.

8. A rubber material as claimed in claim 1 comprising 100 parts of a silicone rubber base stock, 5 parts reinforcing silica, 35 parts semi-reinforcing silica, 30 parts magnesium oxide, 4 parts iron oxide and 2 parts of a cross-linking agent, all parts being by weight.

9. A rubber material as claimed in claim 1 comprising 100 parts of a silicone rubber base stock, 5 parts reinforcing silica, 15 parts semi-reinforcing silica, 50 parts magnesium oxide, 4 parts iron oxide and 2 parts of a cross-linking agent, all parts being by weight.

10. A rubber material as claimed in claim 1 comprising 100 parts of a silicone rubber base stock, 5 parts reinforcing silica, 75 parts magnesium oxide, 4 parts iron oxide and 2 parts of a cross-linking agent, all parts being by weight.

References Cited

UNITED STATES PATENTS 2,843,555  7/1958  Berridge.
3,344,104  9/1967  Hyde _____ 260—37

FOREIGN PATENTS 902,705  9/1962  Great Britain.

MORRIS LIEBMAN, Primary Examiner

L. T. JACOBS, Assistant Examiner